B. R. BENJAMIN.
PITMAN CONNECTION.
APPLICATION FILED JAN. 15, 1912.
1,029,259.
Patented June 11, 1912.
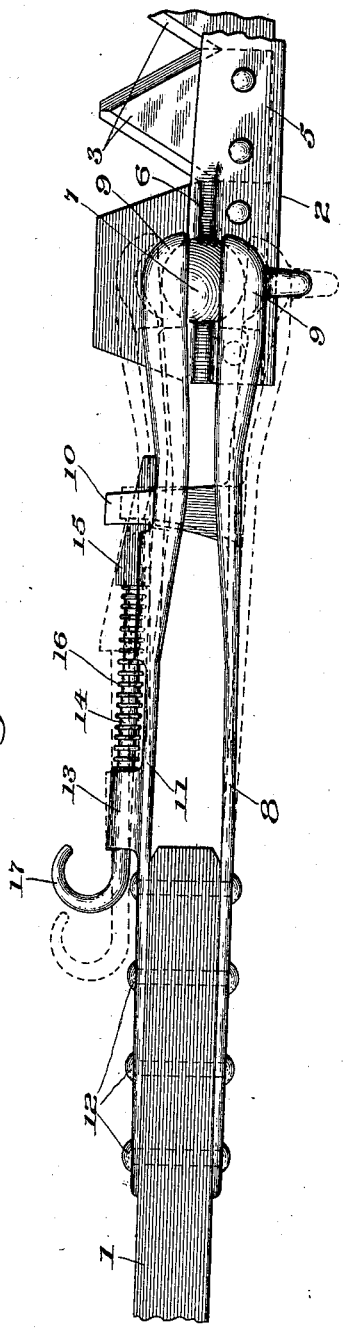
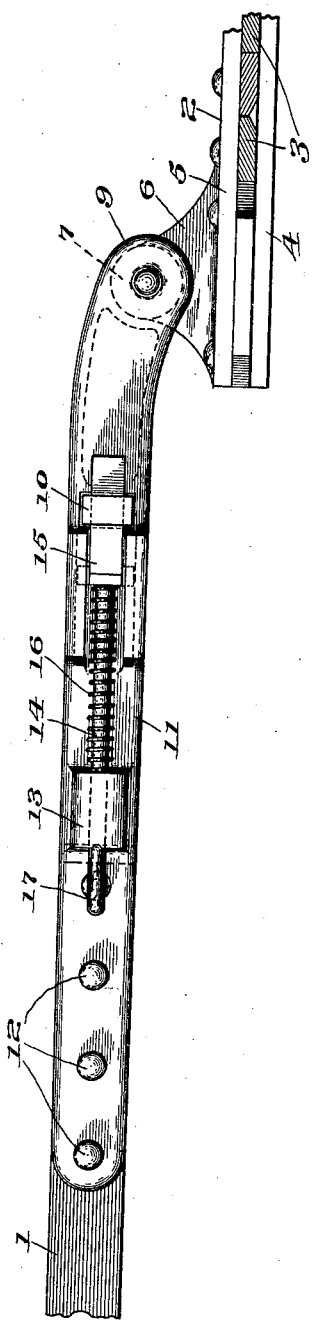
Witnesses:
C. C. Palmer.
F. W. Hoffmeister.
Inventor.
Bert R. Benjamin,
By E. W. Burgess
Attorney.
COLUMBIA PLANOGRAPH CO., WASHINGTON, D. C.

UNITED STATES PATENT OFFICE.

BERT R. BENJAMIN, OF OAK PARK, ILLINOIS, ASSIGNOR TO INTERNATIONAL HARVESTER COMPANY, A CORPORATION OF NEW JERSEY.

PITMAN CONNECTION.

1,029,259.  Specification of Letters Patent.  Patented June 11, 1912.

Application filed January 15, 1912. Serial No. 671,305.

*To all whom it may concern:*

Be it known that I, BERT R. BENJAMIN, a citizen of the United States, residing at Oak Park, in the county of Cook and State of Illinois, have invented certain new and useful Improvements in Pitman Connections, of which the following is a specification.

My invention relates to pitman connections, and in particular to such as are used in connection with the cutting apparatus of mowing machines and harvesters, and consists in improved means for automatically adjusting the bearing jaws in a manner to take up any looseness that may be caused by wear of the operative parts; the object of my invention being to provide a construction simple in its parts, readily applied and efficient in operation. These objects are attained by means of the mechanism illustrated by the accompanying drawings, in which—

Figure 1 is a top plan view of a pitman connection embodying my invention; and Fig. 2 is a side elevation of Fig. 1.

The same reference characters designate like parts throughout the several views.

1 designates the body of the pitman and is commonly made of wood; 2 part of a mower knife including sections 3 secured to the knife back 4, and a knife head 5 having a vertical and longitudinally arranged rib portion 6 that is provided upon opposite sides thereof with semi-spherical bearing portions 7, as is common in the class of machines indicated.

8 represents one of a pair of flexible pitman straps having one end thereof secured to the body of the pitman and its opposite end provided with a bearing socket portion 9 adapted to receive one of the semi-spherical bearing portions, and 10 represents a laterally and inwardly projecting ear member integral with the body of the strap intermediate the bearing socket portion and the end of the pitman body, the ear member being provided with a slot therethrough in the direction of the length of the strap. 11 represents the other member of the pair of flexible straps, having one end secured to the opposite side of the pitman by means of rivets 12, that also secure the strap 8 thereto, the opposite end of the strap being provided with a like bearing socket portion that receives the opposite semi-spherical bearing portion.

13 represents a longitudinally arranged lug upon the outside surface of the strap 11 that is provided with an opening adapted to receive a shank portion 14 of a wedge member 15 that is slidably received by the slotted opening in the ear member 10 of the strap 8, said ear member projecting through an opening in the strap 11, the wedge being operative to close the jaw members upon the spherical bearing block carried by the knife head.

16 represents a coiled compression spring surrounding the shank portion of the wedge and operative between the lug 13 and the head of the wedge member 15 in a manner to slide said wedge in a direction to close the jaw members of the flexible strap members upon the bearing block, and 17 represents a turned hook portion upon the end of the shank outside of lug 13, whereby the wedge may be retracted when it is desired to disconnect the pitman from the knife head, and when the wedge is withdrawn from the slot in the ear member the point thereof will rest upon the end wall of the slot in a manner to retain the wedge in a retracted position. The flexibility of the straps is such as to cause the jaws to open as shown by dotted lines in Fig. 1 when the wedge is withdrawn.

What I claim as my invention, and desire to secure by Letters Patent, is:

1. A pitman connection having, in combination, a pitman body, flexible pitman straps having one end thereof secured to opposite sides of said body and the opposite end thereof provided with jaw members having journal bearing surfaces thereon, a bearing block adapted to be received between said jaws, and means for yieldingly pressing said jaws together in a manner to engage said bearing block, said means including a laterally-projecting ear member integral with one of said strap members and arranged between the jaw members thereof and the body of the pitman, said ear member having a longitudinally-arranged slot therein, the oppositely-disposed strap having an opening therein adapted to receive said ear member, and a springpressed sliding wedge operative between the surface of said strap and the end wall of the slot in said ear member.

2. A pitman connection having, in combination, a pitman body, flexible pitman straps having one end thereof secured to opposite sides of said body and the opposite end thereof provided with jaw members having journal bearing surfaces thereon, a bearing block adapted to be received between said jaws, and means for yieldingly pressing said jaws together in a manner to engage said bearing block, said means including a laterally-projecting ear member integral with one of said strap members and arranged between the jaw members thereof and the body of the pitman, said ear member having a longitudinally-arranged slot therein, the oppositely-disposed strap having an opening therein adapted to receive said ear member, a wedge having the point thereof adapted to be received by said slot, a longitudinally-arranged tang portion integral with the head portion of said wedge, a lug integral with one of said straps and having a longitudinal opening therein adapted to slidably receive said tang portion, and a compression spring encircling said tang portion and operative between the head of said wedge and said lug.

BERT R. BENJAMIN.

Witnesses:
C. G. Grzegorzewski,
E. L. Bacon.

Copies of this patent may be obtained for five cents each, by addressing the "Commissioner of Patents, Washington, D. C."